(12) United States Patent
Weksler et al.

(10) Patent No.: US 12,376,166 B2
(45) Date of Patent: Jul. 29, 2025

(54) WIRELESS ACTIVE REGISTERED OR PAIRED MANIPULATION

(71) Applicant: Lenovo (United States) Inc., Morrisville, NC (US)

(72) Inventors: Arnold S. Weksler, Raleigh, NC (US); John Carl Mese, Cary, NC (US); Nathan J. Peterson, Oxford, NC (US); Russell Speight Vanblon, Raleigh, NC (US); Mark Patrick Delaney, Raleigh, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 488 days.

(21) Appl. No.: 17/678,006

(22) Filed: Feb. 22, 2022

(65) Prior Publication Data
US 2023/0269798 A1 Aug. 24, 2023

(51) Int. Cl.
*H04W 76/14* (2018.01)

(52) U.S. Cl.
CPC .................. *H04W 76/14* (2018.02)

(58) Field of Classification Search
CPC ...................................................... H04W 76/14
USPC ........ 370/310, 328, 329, 338, 341, 345, 350
See application file for complete search history.

(56) References Cited

U.S. PATENT DOCUMENTS

| | | | |
|---|---|---|---|
| 2016/0335638 A1* | 11/2016 | Mauney | G06Q 20/10 |
| 2018/0099230 A1* | 4/2018 | Young | B60L 15/2036 |

FOREIGN PATENT DOCUMENTS

| | | | |
|---|---|---|---|
| CN | 208987206 U | * | 6/2019 |
| KR | 20170062312 A | * | 6/2017 |

\* cited by examiner

*Primary Examiner* — Nghi H Ly
(74) *Attorney, Agent, or Firm* — Schwegman Lundberg & Woessner, P.A.

(57) ABSTRACT

A wireless peripheral device implemented method includes receiving a first input, providing a user perceivable indication of existing wireless pairings of the wireless peripheral device via the wireless peripheral device in response to the first input, receiving a second input, and adding a new wireless pairing in response to the second input.

20 Claims, 2 Drawing Sheets

WIRELESS ACTIVE REGISTERED OR PAIRED MANIPULATION

BACKGROUND

Many users have multiple systems, such as a tablet, a laptop, and a smart phone, as well as multiple different wireless peripheral devices that may be used with such systems. Applications can be installed on a system that allows the user to more easily configure a registered or paired wireless peripheral device like a headset, but the application needs to be installed on all the systems to see what devices have been paired.

SUMMARY

A wireless peripheral device implemented method includes receiving a first input, providing a user perceivable indication of existing wireless pairings of the wireless peripheral device via the wireless peripheral device in response to the first input, receiving a second input, and adding a new wireless pairing in response to the second input.

DETAILED DESCRIPTION

Figure 1:
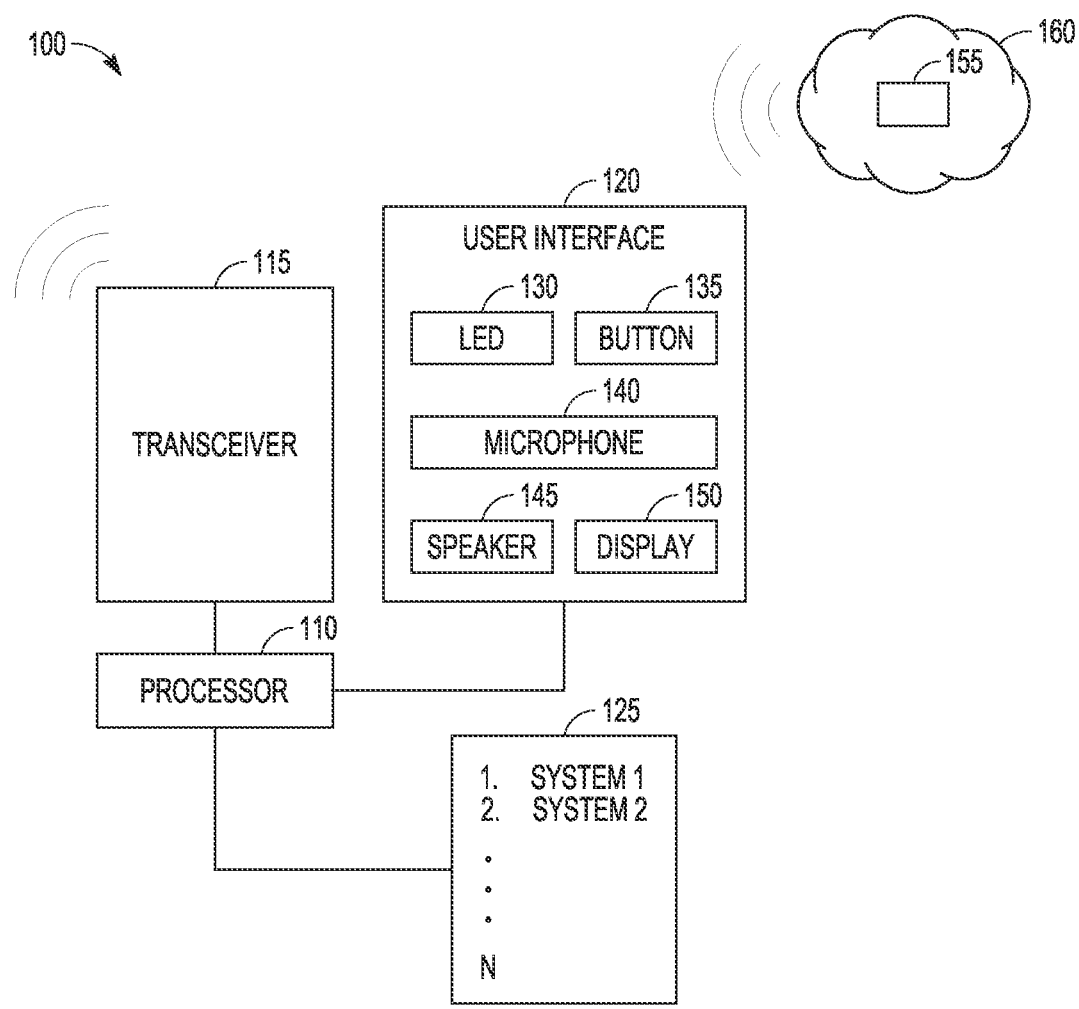
FIG. 1 is a block diagram of a peripheral wireless device the provides wireless pairing information according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

An enhanced wireless peripheral device is configured to provide information regarding wireless pairings with various systems, such as a Bluetooth® pairings. The information may also be provided in response to a user request or during a pairing process. The information may take different forms, such as one or more of how many pairings with one or more systems are currently stored on the wireless peripheral device, how many pairings the wireless peripheral device can support, and how many pairings can be made without deleting an existing pairing.

The pairing information or feedback may be provided in many different user perceivable methods. In various examples, the pairing information may be provided visually via a graphical user interface (GUI) or blinking light source such as a light emitting diode. In other examples the feedback may be in the form of haptic feedback or simple voice prompts.

In response to a new pairing to a new system being configured where the total number of simultaneous wireless pairings available on the wireless peripheral device are already configured with existing pairings, the wireless peripheral device may request a user to authorize the wireless peripheral device to over-write an existing pairing.

In some examples, the wireless peripheral device may be pre-programmed to perform the over-write. In further examples, the wireless peripheral device may prompt the user to select one of multiple options.

A first option is a first-in-first-out (FIFO) option that automatically over-writes an oldest or first registered device that was originally paired. A second option results in the paired registration that has been used the least number of times being over-written. A third options results in use of the connection that was used the longest time ago. A fourth option assigns systems to users and associates the wireless connections to the group of systems that correspond to the users. Such an association facilitates the use of new wireless peripheral device by users that have a lower priority than another user.

In one example, the wireless peripheral device may be a wireless headset or earbud(s) with a voice-based user interface. The headset may be configured to provide voice output stating the maximum number of registered devices or pairings have been reached. One example voice output includes: "Would you like to unpair Pixel4-XL used last year, or another device?" The user may respond with simple yes/no commands.

The headset may vibrate in a selected manner when trying to pair with a new device signifying maximum pairings have been reached. Such a vibration may one or more vibrations of different lengths. User may press an up/down arrow on a user interface or tap a portion of the device one or more times to cause the headset to identify one or more current pairings. A user input, such as a double tap following identification of a pairing would result in the new pairing being accepted and also result in deleting the identified pairing.

A user interface on the wireless peripheral device may display or otherwise identify the current pairings and allow the user to replace an existing registered device or pairing.

In one example, a connection document may identify contact information for one or more users associated with wireless peripheral device connections or an owner of the wireless peripheral device. Notification information such as an email, text, or other means based on the contact information may be used to notify the one or more users or owner in response t a new connection to the wireless peripheral device being requested. The user corresponding to the pairing being removed in response to a new connection can be notified and even asked for permission before the new wireless connection becomes registered or otherwise causes a change in pairings.

In one example, the wireless peripheral device may receive a connection request from a first user system that would result in replacing an active connection to a second user system. Permission may be requested from the second user system prior to accepting the connection request from the first user system.

FIG. 1 is a block diagram of a peripheral wireless device 100, such as a Bluetooth® enabled device. Peripheral wireless device 100 may be a headset, earbud, security camera, printers, and a plethora of other devices designed to connect to a user system such as a laptop computer, touchpad, or smart phone. Peripheral wireless device 100 may include a programmed processor 110 coupled to a transceiver 115 and various user interfaces 120.

Transceiver 115 may be Bluetooth® or other similar dynamic wireless connection enabled device that facilitates a wireless connection to one or more other user systems. In one example, the wireless connection may be a connection having a limited range of connection with the intent being to utilize the wireless peripheral device in conjunction with use of a paired system as opposed to directly connecting to a network node, such as a router or cellular node.

Peripheral wireless device 100 includes a wireless connection list 125 in memory that includes one or more slots for registering connections to systems, referred to as pairing information. The number of slots available for a peripheral wireless device may be limited. In some, the number of slots may be one, two, three, or up to N, where N is greater than three.

The user interface may include one or more of a light emitting diode 130, button 135, microphone 140, speaker 145, display 150, or other means for interacting with the peripheral wireless device 100.

In one example, the peripheral wireless device 100 may store a document 155 locally, or in cloud storage 160. The document may include a unique ID for the peripheral wireless device 100 and include system connection information included in wireless connection list 125, a name of the peripheral wireless device assigned by the user or manufacturer, as well as contact information for users corresponding to the systems in such list. The contact information may be used to communicate with users of the systems to obtain permissions for pairings in the connection list 125 to be modified. In one example, the communications may be initiated by the peripheral wireless device 100 transceiver 115 while a connection is active, using communication capabilities of the connected system. In further examples, the transceiver 115 may connect to any network available using either an open slot, or different type of wired or wireless connection to a network service provider, such as a hotspot or ethernet connection.

Figure 2:
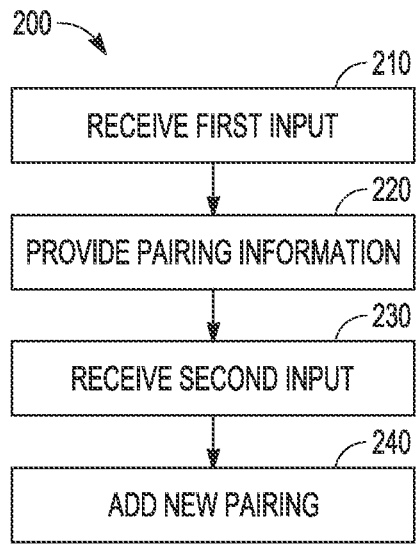
FIG. 2 is a flowchart of a method for managing wireless pairings of a wireless peripheral device according to an example embodiment.

FIG. 2 is a flowchart of a method 200 for managing wireless pairings of a wireless peripheral device. Method 200 includes operation 210 for receiving a first input. The first input may include a wireless connection request from a user in response to a user selecting to connect to the wireless peripheral device from a system. The selecting to connect may be in the form of a request to initiate a pairing process to make the peripheral device discoverable to a system. In further examples, the user may interact directly with the wireless peripheral device to request information regarding wireless pairings.

The wireless peripheral device provides a user perceivable indication of existing wireless pairings of the wireless peripheral device at operation 220 in response to the first input. The user perceivable indication of existing wireless pairings may include a total number of allowable pairings and may even identify existing pairings by name via voice or graphical user interface. In another example, the user perceivable indication of existing wireless pairings comprises an indication of the number of existing wireless pairings.

In a further example, the user perceivable indication of existing wireless pairings includes a blinking light, wherein the number of blinks of the light corresponds to the number of existing wireless pairings. Haptic feedback, such vibrations, with the number of vibrations indicating the number of existing or available pairings may also be used as the user perceivable indication.

A second input is received by the wireless peripheral device at operation 230. The second input may include a user input indicative of accepting the wireless pairing. The second input may include user voice commands, such as a "Yes" or "No" or "Replace pairing number 2."

At operation 240, a new wireless pairing is added in response to the second input. Adding the new wireless pairing may include receiving a peripheral wireless device code which may be factory set to "0000" or other value. Adding the new wireless pairing may include deleting one of the existing pairings prior to adding the new wireless pairing. Deleting one of the existing pairings may include one of deleting an oldest pairing, deleting a least number of times used pairing, or deleting an oldest used pairing.

The user perceivable indication of existing wireless pairing in a further example includes a selectable option of at least one of deleting an oldest pairing, deleting a least number of times used pairing, deleting a user selected pairing, or deleting an oldest used pairing.

In various examples, the user interface may include audible verbalizations, such as a headset speaking the maximum number of registered systems or pairings have been reached. The verbalization may include: "Would you like to unpair Pixel4-XL used last year, or another device?" The user can give simple yes/no commands.

In one example, the headset or other wireless peripheral device may vibrate when trying to pair with a new system signifying maximum pairings have been reached. A user may press the up/down arrow and the headset can state the current pairing. If the user double taps, then that pairing would be used and the new pairing would delete a selected pairing.

In yet a further example, a GUI may appear, showing the current pairing arrangement and allowing the user to replace an existing registered device or pairing.

Figure 3:
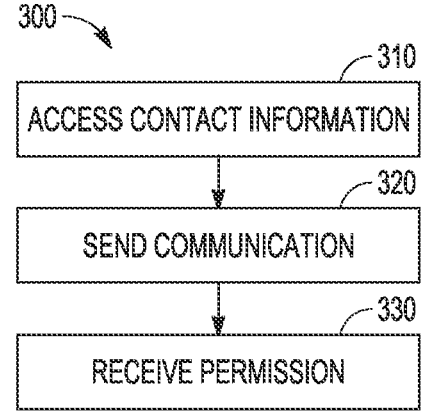
FIG. 3 is a flowchart of a method for obtaining permission prior adding a new wireless pairing according to an example embodiment.

FIG. 3 is a flowchart of a method 300 of obtain permission prior adding a new wireless pairing. Method 300 begins at operation 310 by accessing contact information of a further user of the wireless peripheral device in response to a request from the user or on receiving second input indicating that the new wireless pairing should be added. The contact information may be accessed from local storage or from cloud-based information storage associated with a unique identifier of the wireless peripheral device. At operation 320, a communication is sent to the further user based on the contact information. The new wireless pairing may be added in response to receiving permission from the further user to add the new wireless connection at operation 330.

Figure 4:
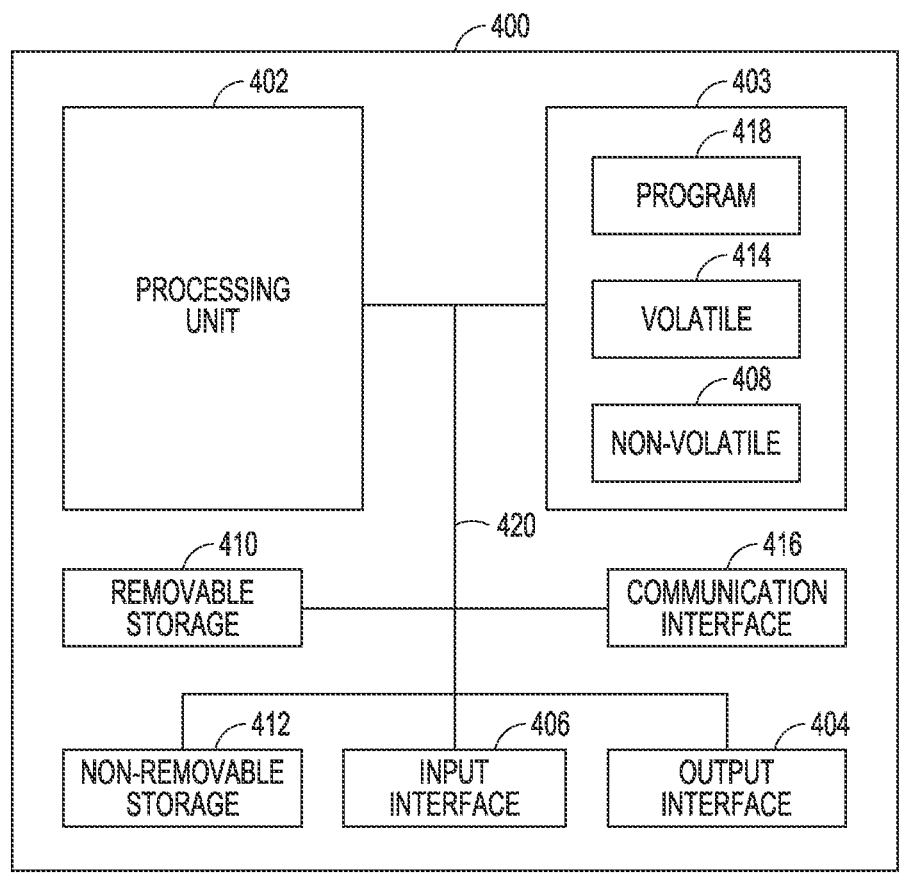
FIG. 4 is a block schematic diagram of a computer system to implement one or more example embodiments.

FIG. 4 is a block schematic diagram of a computer system 400 to implement a wireless peripheral device and systems, and for performing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1 A wireless peripheral device implemented method includes receiving a first input, providing a user perceivable indication of existing wireless pairings of the wireless peripheral device via the wireless peripheral device in response to the first input, receiving a second input, and adding a new wireless pairing in response to the second input.

2. The method of example 1 wherein the first input includes a wireless connection request.

3. The method of example 2 wherein the second input includes a user input indicative of accepting the wireless pairing.

4. The method of any of examples 1-3 wherein adding the new wireless pairing includes deleting one of the existing pairings prior to adding the new wireless pairing.

5. The method of example 4 wherein deleting one of the existing pairings includes one of deleting an oldest pairing, deleting a least number of times used pairing, or deleting an oldest used pairing.

6. The method of any of examples 4-5 wherein the user perceivable indication of existing wireless pairing includes a selectable option of at least one of deleting an oldest pairing, deleting a least number of times used pairing, deleting a user selected pairing, or deleting an oldest used pairing.

7. The method of any of examples 4-6 wherein the user perceivable indication of existing wireless pairings includes an indication of the number of existing wireless pairings.

8. The method of example 7 wherein the user perceivable indication of existing wireless pairings includes a total number of allowable pairings.

9. The method of any of examples 7-8 wherein the user perceivable indication of existing wireless pairings identifies existing pairings by name, via voice, via a graphical user interface, or via haptic feedback.

10. The method of any of examples 7-9 wherein the user perceivable indication of existing wireless pairings includes a blinking light, wherein the number of blinks of the light corresponds to the number of existing wireless pairings.

11. The method of any of examples 1-10 and further including prior to adding the new wireless pairing, accessing contact information of a further user of the wireless peripheral device, sending a communication to the further user, and receiving permission from the further user to add the new wireless connection.

12. The method of example 11 wherein the contact information is accessed from cloud-based information storage associated with a unique identifier of the wireless peripheral device.

13. A machine-readable storage device has instructions for execution by a processor of a wireless peripheral device to cause the processor to perform operations to perform a method. The operations include receiving a first input, providing a user perceivable indication of existing wireless pairings of the wireless peripheral device via the wireless peripheral device in response to the first input, receiving a second input, and adding a new wireless pairing in response to the second input.

14. The device of example 13 wherein the first input includes a wireless connection request and wherein the second input comprises a user input indicative of accepting the wireless pairing.

15. The device of any of examples 13-14 wherein adding the new wireless pairing includes deleting one of the existing pairings prior to adding the new wireless pairing by one of deleting an oldest pairing, deleting a least number of times used pairing, or deleting an oldest used pairing.

16. The device of any of examples 13-15 wherein the operations further include, prior to adding the new wireless pairing, accessing contact information of a further user of the wireless peripheral device, sending a communication to the further user, and receiving permission from the further user to add the new wireless connection.

17. The device of example 16 wherein the contact information is accessed from cloud-based information storage associated with a unique identifier of the wireless peripheral device.

18. A wireless peripheral device includes a processor and a memory device coupled to the processor and having a program stored thereon for execution by the processor to perform operations. The operations include receiving a first input, providing a user perceivable indication of existing wireless pairings of the wireless peripheral device via the wireless peripheral device in response to the first input, receiving a second input, and adding a new wireless pairing in response to the second input.

19. The device of example 18 wherein the first input includes a wireless connection request and wherein the second input comprises a user input indicative of accepting the wireless pairing and wherein adding the new wireless pairing includes deleting one of the existing pairings prior to adding the new wireless pairing by one of deleting an oldest pairing, deleting a least number of times used pairing, or deleting an oldest used pairing.

20. The device of any of examples 18-19 wherein the operations further include, prior to adding the new wireless pairing, accessing contact information of a further user of the wireless peripheral device, sending a communication to the further user, and receiving permission from the further user to add the new wireless connection.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A wireless peripheral device implemented method comprising:
   receiving a first input;
   providing a user perceivable indication of devices previously paired with the wireless peripheral device via the wireless peripheral device in response to the first input;
   receiving a second input; and
   adding a new wireless pairing in response to the second input.

2. The method of claim 1 wherein the first input comprises a wireless connection request.

3. The method of claim 2 wherein the second input comprises a user input indicative of accepting the wireless pairing.

4. The method of claim 1 wherein adding the new wireless pairing comprises deleting one of the existing pairings prior to adding the new wireless pairing.

5. The method of claim 4 wherein deleting one of the existing pairings comprises one of deleting an oldest pairing, deleting a least number of times used pairing, or deleting an oldest used pairing.

6. The method of claim 4 wherein the user perceivable indication of existing wireless pairing comprises a selectable option of at least one of deleting an oldest pairing, deleting a least number of times used pairing, deleting a user selected pairing, or deleting an oldest used pairing.

7. The method of claim 4 wherein the user perceivable indication of existing wireless pairings comprises an indication of the number of existing wireless pairings.

8. The method of claim 7 wherein the user perceivable indication of existing wireless pairings includes a total number of allowable pairings.

9. The method of claim 7 wherein the user perceivable indication of existing wireless pairings identifies existing pairings by name, via voice, via a graphical user interface, or via haptic feedback.

10. The method of claim 7 wherein the user perceivable indication of existing wireless pairings comprises a blinking light, wherein the number of blinks of the light corresponds to the number of existing wireless pairings.

11. The method of claim 1 and further comprising prior to adding the new wireless pairing:
  accessing contact information of a further user of the wireless peripheral device;
  sending a communication to the further user; and
  receiving permission from the further user to add the new wireless pairing.

12. The method of claim 11 wherein the contact information is accessed from cloud-based information storage associated with a unique identifier of the wireless peripheral device.

13. A machine-readable storage device having instructions for execution by a processor of a wireless peripheral device to cause the processor to perform operations to perform a method, the operations comprising:
  receiving a first input;
  providing a user perceivable indication of devices previously paired with the wireless peripheral device via the wireless peripheral device in response to the first input;
  receiving a second input; and
  adding a new wireless pairing in response to the second input.

14. The device of claim 13 wherein the first input comprises a wireless connection request and wherein the second input comprises a user input indicative of accepting the wireless pairing.

15. The device of claim 13 wherein adding the new wireless pairing comprises deleting one of the existing pairings prior to adding the new wireless pairing by one of deleting an oldest pairing, deleting a least number of times used pairing, or deleting an oldest used pairing.

16. The device of claim 13 wherein the operations further comprise, prior to adding the new wireless pairing:
  accessing contact information of a further user of the wireless peripheral device;
  sending a communication to the further user; and
  receiving permission from the further user to add the new wireless pairing.

17. The device of claim 16 wherein the contact information is accessed from cloud-based information storage associated with a unique identifier of the wireless peripheral device.

18. A wireless peripheral device comprising:
  a processor; and
  a memory device coupled to the processor and having a program stored thereon for execution by the processor to perform operations comprising:
  receiving a first input;
  providing a user perceivable indication of devices previously paired with the wireless peripheral device via the wireless peripheral device in response to the first input;
  receiving a second input; and
  adding a new wireless pairing in response to the second input.

19. The device of claim 18 wherein the first input comprises a wireless connection request and wherein the second input comprises a user input indicative of accepting the wireless pairing and wherein adding the new wireless pairing comprises deleting one of the existing pairings prior to adding the new wireless pairing by one of deleting an oldest pairing, deleting a least number of times used pairing, or deleting an oldest used pairing.

20. The device of claim 18 wherein the operations further comprise, prior to adding the new wireless pairing:
  accessing contact information of a further user of the wireless peripheral device;
  sending a communication to the further user; and
  receiving permission from the further user to add the new wireless pairing.

* * * * *